Jan. 14, 1969   R. W. KEARNS   3,422,331
MOTOR SPEED CONTROL SYSTEMS
Filed March 7, 1966

INVENTOR
Robert W. Kearns

BY Lane, Aitken, Dunner & Ziems
ATTORNEYS

United States Patent Office 3,422,331
Patented Jan. 14, 1969

---

3,422,331
MOTOR SPEED CONTROL SYSTEMS
Robert W. Kearns, Detroit, Mich., assignor, by mesne assignments, to Tann Company, Detroit, Mich., a partnership of Michigan
Filed Mar. 7, 1966, Ser. No. 532,180
U.S. Cl. 318—331                23 Claims
Int. Cl. H02p 5/00; H02k 27/20

ABSTRACT OF THE DISCLOSURE

This specification discloses motor speed control circuits in which a signal representing the armature voltage or signals representing both the armature voltage and the armature current are fed back to an amplifier to regulate the speed of the motor. The amplifier comprises the three stages of amplification, each of which is in the form of a transistor the last transistor being connected in series with the armature of the motor. The speed at which the motor operates is controllable by means of a potentiometer which also feeds a signal to the input of the amplifier.

---

This invention relates to motor speed control systems and more particularly to transistorized motor speed control systems, which are variable and which employ feedback to achieve a constant speed under varying loads.

In many applications it is desirable to continuously vary the speed of the electric motor and yet to make the motor speed constant at the selected speed with varying loads on the motor. An example of such an application is an electrically driven windshield wiper. The present invention provides improved transistorized circuits for achieving this result.

In accordance with one embodiment of the invention voltage feedback is employed to control the voltage across the armature of the motor to be at a selected value. In this system the speed is set by an input voltage produced by a potentiometer and the voltage across the armature is controlled to be near the input voltage. When the speed of rotation of the armature changes as a result of a change in the load on the motor for example, the back EMF of the motor will change resulting in a corresponding change in the voltage across the armature. In accordance with the invention any change in the voltage across the armature is amplified and fed back to bring the voltage across the armature back to the desired value. In this manner the voltage across the armature is maintained substantially constant and the speed of the motor is maintained relatively constant under varying light loads.

The system described above however does not keep the motor speed as constant as it might with varying loads because the voltage across the armature of the motor is not all back EMF. Some of the voltage drop across the armature is the IR drop (current×resistance) across the resistance of the armature. As the load on the motor increases the IR drop increases and becomes a greater factor of the voltage across the armature. Accordingly, when the motor is subjected to heavy loads maintaining the voltage across the armature constant will not maintain the motor speed constant.

In accordance with a more sophisticated embodiment of the present invention this problem is overcome by detecting changes in armature current and feeding back a signal proportional to the armature current as well as using voltage feedback as described above. In this manner the speed of the motor is maintained constant at a value corresponding to the input voltage even though the load on the motor varies from being heavy to light.

Accordingly, an object of the present invention is to provide an improved motor control system.

Another object of the present invention is to provide a motor control system including means making the speed of the motor variable over a continuous range, which speed control system will maintain the speed of the motor constant at the selected speed even though the load across the motor varies.

A further object of the present invention is to provide an improved transistorized motor speed control system.

A still further object of the present invention is to provide a motor control system which employs feedback to maintain the speed of the motor constant under varying loads.

A still further object of the present invention is to provide a speed control system which employs both voltage and current feedback to maintain the speed of the motor constant under varying loads.

Further objects and advantages of the present invention will become readily apparent as the following detailed description of the invention unfolds and when taken in conjunction with the drawings wherein.

Figure 1:
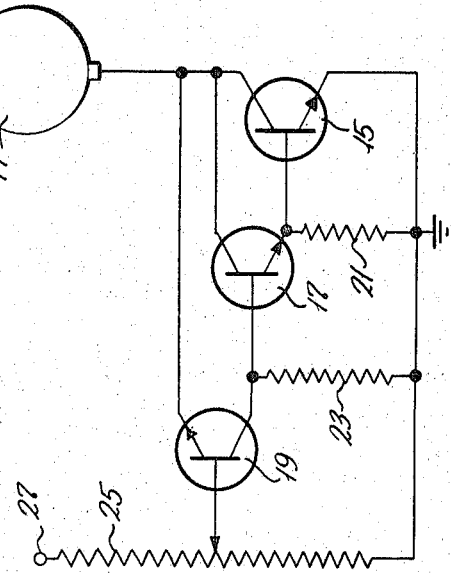
FIG. 1 illustrates a motor speed control system in accordance with one embodiment of the present invention employing only voltage feedback.

As shown in FIG. 1 the armature of the motor is designated by the reference number 11. The motor used in the circuits of the present invention is a DC motor of the fixed field type such as would be provided by a permanent magnet or a field winding connected directly across a source of DC power. It will be understood, however, that the principles of the present invention will be applicable to other kinds of motors, the speed of which can be controlled by varying the current or voltage applied thereto.

One side of the armature 11 is connected to the negative source of DC power applied to a terminal 13. The other side of the armature 11 is connected to the collector of a transistor 15, the collector of a transistor 17, and the emitter of a transistor 19. The emitter of the transistor 15, which is a high current capacity transistor, is connected to ground. The emitter of the transistor 17 is connected to the base of the transistor 15 and is connected to ground through a resistor 21. The collector of the transistor 19 is connected to the base of the transistor 17 and through a resistor 23 to ground. The base of the transistor 19 is connected to the movable tap of a potentiometer 25 which is connected between a source of negative DC voltage applied at a terminal 27 and the ground. The DC voltage applied at the terminal 27 and at the terminal 13 is the same. The resistors 21 and 23 serve to provide temperature compensation and could be eliminated if this feature were not desired. The transistors 15 and 17 are PNP transistors whereas the transistor 19 is an NPN transistor. PNP and NPN transistors are referred to as being opposite conductivity type transistors.

When the motor controlled is a windshield wiper motor, the control knob for adjusting the movable arm of the potentiometer is mounted on the vehicle dashboard and combined with an off-on switch for the motor.

In the circuit of FIG. 1 the voltage produced at the movable tap of the potentiometer 25 and applied to the base of the transistor 19 determines the voltage applied across the armature 11 of the motor and thus determines the speed which the motor will operate. By moving the movable tape of the potentiometer 25 toward the terminal 27 the speed of the motor 11 will be decreased and by moving the movable tap toward the grounded end of the potentiometer 25 the speed of the motor will be increased.

The transistor 19 operates as an emitter follower to set the voltage across the armature 11 to be approximately the voltage between the terminal 27 and the movable arm of the potentiometer 25. Since the voltage drop between the base and the emitter of the transistor 19 is about 0.2 volt the voltage across the armature 11 will actually be about 0.2 volt less than the voltage between the movable arm of the potentiometer 25 and the terminal 27. The voltage across the armature 11 controls the speed of the motor because the speed of the motor will increase or decrease until the back EMF generated by the motor plus the IR drop through the armature equals the voltage across the armature. Since the IR drop is small under light loads, the controlling of the voltage across the armature 11 to be constant will maintain the speed of the motor constant under relatively light loads.

When the load on the motor increases tending to slow the motor down the back EMF would tend to drop. This would tend to increase the base to the emitter voltage of the transistor 19, which in response thereto would increase the current flow in the collector of the transistor 19. This action would increase the current flowing out of the base of the transistor 19 which in turn would amplify this increase in current and increase the current flowing out of the collector of the transistor 17 and into the emitter of the transistor 17. The increased current flow into the emitter of the transistor 17 will increase the current flowing out of the base of the transistor 15. The transistor 15 then amplifies this increase in current flowing out of the base and produces an increased current flow in its collector. Thus the current flowing through the armature 11 will increase so as to cause the motor to increase its speed. In this manner the speed of the motor is maintained relatively constant under varying light loads.

Most of the current flowing through the armature 11 is supplied by the power transistor 15 although it should be noted that the voltage across the armature 11 is set by the emitter follower action of the transistor 19. The transistor 15 acts to supply enough current to armature 11 to maintain the voltage across the armature at the value set by the transistor 19. Due to the amplification provided by the transistors 19, 17 and 15 very little voltage change will occur across the armature 11 and thus the speed of the motor will be maintained relatively constant as long as the IR drop through the armature 11 is not a substantial factor in the voltage across the armature 11.

Since changes in voltage across the armature 11 are detected by the transistor 19 and amplified by the transistors 19, 17 and 15 to change the current flowing in the armature 11, the circuit of FIG. 1 is a voltage feedback system in which the changes in voltage across the armature 11 are fed back to the input of the amplifier comprising the transistors 15, 17 and 19 to maintain the voltage constant.

Figure 2:
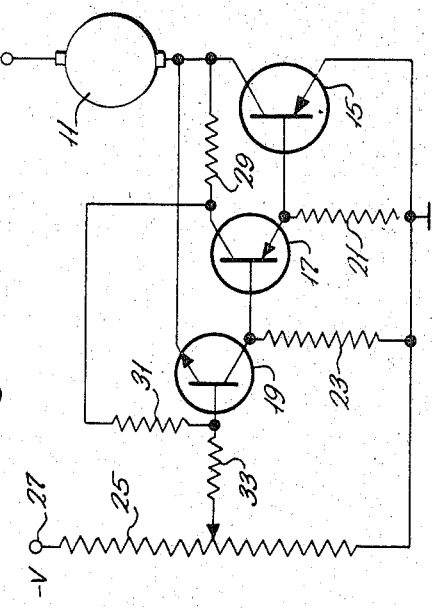
FIG. 2 is a circuit diagram of a speed control system in accordance with a second embodiment of the invention employing both voltage and current feedback.
Figure 3:
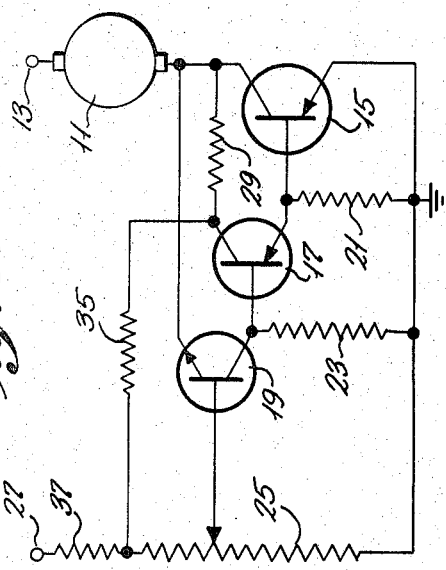
FIG. 3 is a circuit diagram of a third embodiment of the invention also employing both voltage and current feedback.

The circuit of FIG. 1 will provide a constant speed for the motor for as long as the load on the motor does not become so large as to make the IR drop across the armature a significant portion of the voltage across the armature. Under heavy loads the circuit of FIG. 1 will maintain the voltage across the armature substantially constant, but the speed of the motor will not remain constant because the back EMF produced by the armature will drop by the amount equal to the increase in the IR drop across the armature. The circuits of FIGS. 2 and 3 are designed to overcome the deficiency of the circuit of FIG. 1 in this respect by providing a feedback to the input of the amplifier comprising the three transistors proportional to the current flow through the armature. When the current flow through the armature increases, the circuits of FIGS. 2 and 3 apply a signal voltage to the base of the input transistor 19 in a direction to increase the current flow through and the voltage across the armature of the motor. As a result under increased loads the voltage across the armature is actually increased so that the speed of the motor is maintained constant.

In the circuit of FIG. 2 the feeding back of a voltage proportional to the armature current is accomplished by replacing the direct connection of the collector of the transistor 17 to the armature 11 with a resistor 29 and by connecting a resistor 31 between the collector of the transistor and the base of the transistor 19. The direct connection between the movable arm of the potentiometer 25 and the transistor 19 is replaced by a resistor 33. Although the major current to the armature 11 is supplied by the transistor 15, the current flowing through the transistor 17 will vary in proportion to the armature current. Accordingly, with the resistor 29 connected between the collector of the transistor 17 and the armature 11, the voltage at the collector of the transistor 17 will vary in accordance with the armature current and as the armature current increases the voltage at the collector of the transistor 17 will become more positive and when the armature current decreases the voltage at the collector of the transistor 17 will become more negative. Current will flow from the collector of the transistor 17 through the resistor 31 and through the resistor 33 to the potentiometer 25. As a result the voltage on the movable tap of the potentiometer is summed with a signal voltage proportional to armature current at the base of the transistor 19. In this manner a signal voltage proportional to armature current is fed back to the input of the amplifier comprising transistors 15, 17 and 19. Accordingly, when the load on the motor is increased current flow through the resistor 29 will increase causing the potential at the collector of the transistor 17 to become more positive. This in turn will cause the voltage at the base of the transistor 19 to become more positive and accordingly the current flow through the transistor 19 will increase. As a result the current flow through the transistors 17 and 15 will increase, increasing the current flow through the armature 11. Accompanying this increase in current flow will be an increase in the voltage across the armature 11 as a result of the increase in voltage applied at the base of the transistor 19. Thus it will be seen that as the load on the motor increases causing an increase in the current flow in the armature of the motor, the voltage across the armature will be increased and the armature current will be further increased to compensate for the increased IR drop. In a similar manner when the armature current drops as a result of a decrease in load, the feedback of the signal voltage proportional to armature current will cause the voltage across the armature to be decreased and the armature current to be further decreased to compensate for the decreased IR drop. In this manner the speed of the motor is maintained constant under widely varying loads. Thus the circuit in FIG. 2 employs both feedback proportional to armature voltage changes and feedback proportional to armature current to maintain the speed of the motor constant.

The circuit of FIG. 3 is similar to that of FIG. 2 except that instead of feeding the signal voltage generated at the collector of the transistor 17 to the base of the transistor 19 by means of the resistors 31 and 33, the signal voltage is fed back to the potentiometer 25 by connecting the collector of the transistor 17 through a resistor 35 to the ungrounded end terminal of the potentiometer 25 and connecting this terminal of the potentiometer 25 to the source of negative potential at terminal 27 through a resistor 37. In the circuit of FIG. 3, when the current through the armature changes, the current through the resistor 29 will change causing the potential at the collector of the transistor 17 to change accordingly. This signal voltage will be fed by means of the resistor 35 to the junction between the potentiometer 25 and the resistor 37. This action will change the potential at the base of the transistor 19 and thus change the voltage across the armature 11 and the current flow through the armature 11 in the same manner as described with reference to FIG. 2.

In this manner the change in IR drop that occurs as a result of the change in current flow when the load on the motor changes will be compensated and the speed of the motor will be maintained constant.

In the circuits of FIGS. 2 and 3 it will be noted that the resistor 29, which generates the feedback signal proportional to armature current is not in the path of the major portion of the armature current, which flows through the transistor 15. If the feedback signal voltage proportional to current were generated by placing a resistor directly in series with the armature, the very problem which the circuit of the present invention is designed to overcome would be aggravated. For the resistor in series with the armature would in effect increase the armature resistance and deleteriously affect the speed regulation. By inserting the current measuring resistor in series with the collector of transistor 17 an indirect measure of current is achieved without significantly increasing the resistance in series with the armature.

Thus there are provided motor control circuits which are selectively variable over a continuous range and which maintain the speed of the motor constant at the selected speed under varying loads. The above description is of a preferred embodiment of the invention and many modifications may be made thereto without departing from the spirit and scope of the invention which is defined in the appended claims.

The invention claimed is:

1. A motor control system comprising an electric motor, an amplifier connected to said motor controlling the flow of current through said motor, means to apply a selectively variable input signal to the input of said amplifier to selectively vary the current flow through said motor, first feedback means to feed back a signal to the input of said amplifier varying in accordance with changes in the voltage across said motor with a polarity to counteract such changes in voltage, and second feedback means to feed back a signal to the input of said amplifier varying in accordance with changes in current flowing through said motor with a polarity to increase the motor current in response to increases in motor current and to decrease the motor current in response to decreases in motor current.

2. A motor control system as recited in claim 1 wherein said amplifier comprises a transistor having its emitter and collector connected in series with said motor.

3. A motor control system as recited in claim 1 wherein said amplifier comprises a plurality of stages of amplification with each stage comprising a transistor, the transistor of the last stage having its emitter and collector connected in series with said motor.

4. A motor control system as recited in claim 1 wherein said amplifier comprises at least three stages of amplification and said second feedback means detects the amount of current flowing in a middle one of said stages to generate the signal varying in accordance with the current flowing in said motor.

5. A motor control system as recited in claim 1 wherein said selectively variable input signal applied to the input of said amplifier is variable over a continuous range.

6. A motor control system comprising an electric motor for driving a variable load, a first transistor having its emitter and collector connected in series with said motor, a second transistor having its emitter connected to the junction between said motor and said first transistor, first circuit means to apply to the base of said second transistor a selectively variable signal voltage, and second circuit means to drive the base current of said first transistor in accordance with variations in the collector current of said second transistor and means including said first and second circuit means to bias said second transistor so that it remains conductive substantially throughout the entire range of load variation on said motor.

7. A motor control system as recited in claim 6 wherein said first transistor and said second transistor are of opposite conductivity types.

8. A motor control system comprising an electric motor, a first transistor having its emitter and collector connected in series with said motor, a second transistor having its emitter connected to the junction between said motor and said first transistor, means to apply to the base of said second transistor a selectively variable signal voltage, means to drive the base current of said first transistor in accordance with variations in the collector current of said second transistor, and means to apply a signal voltage between the base and emitter of said second transistor varying in accordance with the current flowing through said motor.

9. A motor control system comprising an electric motor, a first transistor having its emitter and collector connected in series with said motor, a second transistor having its emitter connected to the junction between said motor and said first transistor, means to apply to the base of said second transistor a selectively variable signal voltage, and means to drive the base current of said first transistor in accordance with variations in the collector current of said second transistor, said means to drive the base current of said first transistor comprising a third transistor having its collector connected to the junction between said first transistor and said motor, having its emitter connected to the base of said first transistor and having its base connected to the collector of said second transistor.

10. A motor control system as recited in claim 9 wherein the connection from the collector of said third transistor to the junction between said first transistor and said motor includes a resistor and wherein there is provided means to apply a signal voltage between the base and emitter of said second transistor varying in accordance with the voltage at the collector of said third transistor.

11. A motor control system as recited in claim 9 wherein said first and third transistors are of one type conductivity and said second transistor is of the opposite type conductivity.

12. A motor control system comprising an electric motor for driving a variable load, a D.C. power source, an amplifier powered by said D.C. power source connected to said motor controlling the flow of current from said D.C. power source through said motor, means to apply to the input of said amplifier an input signal selectively variable over a continuous range to selectively vary the current flow through said motor, and feedback means to feed back a signal to the input of said amplifier varying in accordance with changes in the voltage across said motor with a polarity to counteract such changes in voltage, said amplifier including biasing means to make said amplifier respond to changes in said feedback signal in both directions throughout the entire range of load variation upon said motor.

13. A motor control system as recited in claim 12 wherein said first mentioned means comprises a potentiometer having a movable tap connected to the input of said amplifier.

14. A motor control system comprising an electric motor, an amplifier connected to said motor controlling the flow of current through said motor, means to apply to the input of said amplifier an input signal selectively variable over a continuous range to selectively vary the current flow through said motor, and feedback means to feed back a signal to the input of said amplifier varying in accordance with changes in the voltage across said motor with a polarity to counteract such changes in voltage, said amplifier comprising at least three stages of amplification with each stage comprising a transistor, the transistor of the last stage having its emitter and collector connected in series with said motor and the transistors of the first and last stages being of opposite conductivity types.

15. A motor control system comprising an electric motor for driving a variable load, a D.C. power supply, an amplifier powered by said D.C. power supply and connected to said motor controlling the flow of current from said D.C. power supply through said motor, a potentiometer having a movable tap connected to the input of said amplifier, said potentiometer being connected to apply to the input of said amplifier over said movable tap an input signal selectively variable over a continuous range to selectively vary the current flow through said motor, and feedback means to feed back a signal to the input of said amplifier varying in accordance with changes in an electrical condition of said motor with a polarity to counteract such changes in electrical condition, said amplifier including biasing means to make said amplifier respond to changes in said feedback signal in both directions throughout the entire range of load variation upon said motor.

16. A motor control system comprising an electric motor, an amplifier connected to said motor controlling the flow of current through said motor, a potentiometer having a movable tap connected to the input of said amplifier, said potentiometer being connected to apply to the input of said amplifier over said movable tap an input signal selectively variable over a continuous range to selectively vary the current flow through said motor, and feedback means to feed back a signal to the input of said amplifier varying in accordance with changes in an electrical condition of said motor with a polarity to counteract such changes in electrical condition, said feedback signal being applied through the resistance of said potentiometer to the input of said amplifier.

17. A motor control system as recited in claim 16 wherein said amplifier comprises transistor means having emitter, collector and base electrodes, said emitter and collector electrodes being in series with said motor with the collector electrode connected to said motor, the movable tap of said potentiometer being connected to said base electrode, and said feedback means being connected between said collector electrode and one end of the resistance of said potentiometer.

18. A motor control system comprising an electric motor, an amplifier connected to said motor controlling the flow of current through said motor, a potentiometer having a movable tap connected to the input of said amplifier, said potentiometer being connected to apply to the input of said amplifier over said movable tap an input signal selectively variable over a continuous range to selectively vary the current flow through said motor, feedback means to feed back a signal to the input of said amplifier varying in accordance with changes in an electrical condition of said motor with a polarity to counteract such changes in electrical condition, and bypass means including said feedback means to complete a bypass resistance circuit in parallel with said transistor means.

19. A motor control system as recited in claim 18 wherein said amplifier comprises transistor means having emitter, collector and base electrodes, said emitter and collector electrodes being in series with said motor with the collector electrode connected to said motor, the movable tap of said potentiometer being connected to said base electrode, and including means connecting said potentiometer to said emitter electrode, said last mentioned means together with said feedback means completing a bypass resistance circuit bypassing said transistor means.

20. A motor control system as recited in claim 19 wherein said potentiometer is included in said bypass resistance circuit so as to enable the resistance of said bypass resistance circuit to be varied.

21. A motor control system comprising an electric motor, an amplifier connected to said motor controlling the flow of current through said motor, means to apply to the input of said amplifier an input signal selectively variable over a continuous range to selectively vary the current flow through said motor, and feedback means to feed back a signal to the input of said amplifier varying in accordance with changes in the voltage across said motor with a polarity to counteract such changes in voltage, and bypass means including said feedback means to complete a bypass resistance circuit in parallel with said amplifier.

22. A motor control system as recited in claim 21 wherein said first mentioned means is included in said bypass means in a manner to selectively vary the current flow to said motor.

23. A motor control system comprising an electric motor, a first transistor having its emitter and collector connected in series with said motor, a second transistor having its emitter connected to the junction between said motor and said first transistor, means to apply to the base of said second transistor a selectively variable signal voltage, means to drive the base current of said first transistor in accordance with variations in collector current of said second transistor, and circuit means to apply power to said first and second transistors by connecting the emitter of said first transistor and the collector of said second transistor to a common reference potential.

References Cited
UNITED STATES PATENTS 2,975,349   3/1961   Green  ------------ 318—345 X
3,286,151  11/1966  Dinger  ------------ 318—331

ORIS L. RADER, *Primary Examiner.*

H. HUBERFELD, *Assistant Examiner.*

U.S. Cl. X.R.

318—332, 345